United States Patent
Konuma et al.

[11] Patent Number: 5,764,320
[45] Date of Patent: Jun. 9, 1998

[54] LIQUID CRYSTAL DISPLAY DEVICE

[75] Inventors: Toshimitsu Konuma; Jun Koyama, both of Kanagawa; Shunpei Yamazaki, Tokyo; Yoshitaka Yamamoto, Nara, all of Japan

[73] Assignees: Semiconductor Energy Laboratory Co., Kanagawa-ken; Sharp Kabushiki Kaisha, Osaka, both of Japan

[21] Appl. No.: 766,662

[22] Filed: Dec. 16, 1996

[30] Foreign Application Priority Data

Dec. 19, 1995 [JP] Japan .................. 7-349230

[51] Int. Cl.⁶ .................. G02F 1/1333; G02F 1/1345; G02F 1/13
[52] U.S. Cl. .................. 349/40; 349/151; 349/192
[58] Field of Search .................. 349/11, 54, 192, 349/40

[56] References Cited

U.S. PATENT DOCUMENTS

| 5,148,301 | 9/1992 | Sawatsubashi | 349/151 |
| 5,200,847 | 4/1993 | Mawatari et al. | 349/151 |
| 5,250,931 | 10/1993 | Misawa et al. | 349/151 |
| 5,412,495 | 5/1995 | Kim | 34/40 |
| 5,668,032 | 9/1997 | Holmberg et al. | 349/40 |

FOREIGN PATENT DOCUMENTS

| 62-147433 | 7/1987 | Japan | 349/54 |
| 4-42215 | 2/1992 | Japan | 349/55 |

*Primary Examiner*—Anita Pellman Gross
*Attorney, Agent, or Firm*—Fish & Richardson P.C.

[57] ABSTRACT

Within an active matrix liquid crystal display device, short rings, which prevent breakdown of TFTs due to static electricity which may occur in an assembling step, are provided on the TFT substrate covering with the opposed substrate. With this configuration, the same size substrates are able to utilize as the TFT and the opposed substrates. Moreover, even if the short rings are cut in the assembling step, no deterioration occurs in display performance because the short ring cutting portion is protected from the eternal environment by an opposed substrate and a liquid crystal. Thus, the reliability of the device is improved.

7 Claims, 6 Drawing Sheets

5,764,320

LIQUID CRYSTAL DISPLAY DEVICE

BACKGROUND OF THE INVENTION

1. Field of the Invention

The present invention relates to an active matrix liquid crystal display device in which pixel thin-film transistors and peripheral driver circuit thin-film transistors are formed on the same substrate.

2. Description of Related Art

Liquid crystal display devices are commonly used in TV sets and word processors as thin, lightweight display devices. In particular, active matrix liquid crystal display devices in which thin-film transistors (hereinafter abbreviated as TFTs) are formed for respective display pixels by utilizing the manufacturing technology for integrated circuits such as ICs and LSIs are promising as liquid crystal display devices capable of displaying superior images.

Among the several types of active matrix liquid crystal display devices, a type in which peripheral drivers circuits are formed on the same substrate as display pixels is particularly promising because it eliminates the need of providing driver circuits outside the substrate and therefore enables manufacture of smaller display devices, that is, it has a wide application range.

In the above type of active matrix liquid crystal display device, to prevent breakdown of the TFTs that are arranged in the pixel region due to static electricity occurring at an assembling step, measures are taken which prevents the static electricity from concentrating at the TFTs. That is, wiring lines (hereinafter called "short rings") connected to one or both of the gates and the sources are connected together at an peripheral portion of a substrate.

FIGS. 1A and 1B show a conventional active matrix liquid crystal display device. Conventionally, a TFT substrate 101 projects from the expanse common to an opposed substrate 105, and a short ring connecting portion 106 is formed on an peripheral portion of the TFT substrate 101 and outside the opposed substrate 105. Reference numerals 102 to 104 denote a sealing member, peripheral driver circuits, and a pixel region, respectively. With this configuration, extra spaces are needed to accommodate the projecting portions in mounting the above liquid crystal display device on the outer flame.

After the bonding of the TFT substrate 101 and the opposed substrate 105, the short rings are cut near the connecting portion 106 at substrate scribing step or after liquid crystal injection. As for the manner of cutting the short rings, the TFT substrate 101 is divided mechanically, i.e., scribed, or the short rings are cut by irradiating laser light or the like.

Where the short rings are cut by laser light 11 in the liquid crystal display device of FIG. 1A, a short ring cutting portion 107 is located on the TFT substrate 101 and exposed, i.e., not covered with the opposed substrate 105. Therefore, a portion damaged by laser light irradiation is not protected as long as no specific treatment is made. Further, there is a possibility that, by laser light irradiation, scattered metal fragments and damaged or deformed portions of metal wiring lines are brought into contact with an adjacent gate line or source line to cause an insulation failure.

SUMMARY OF THE INVENTION

The present invention has been made to solve the above problems, and has an object of providing a liquid crystal display device which can protect a short ring cutting portion.

Another object of the invention is to provide a liquid crystal display device which can be reduced in size of the entirety but keeping that of the pixel region.

To attain the above objects, a short ring cutting portion, which is formed outside a sealing member conventionally, is provided in an area that is interposed between a TFT substrate and an opposed substrate, so that the short ring cutting portion is isolated from the external environment. Further, the liquid crystal display device is so constructed that the short ring cutting portion contacts with a liquid crystal. In this manner, the short ring cutting portion is protected.

Further, the short ring cutting portion is enclosed by the sealing member and the TFT substrate and the opposed substrate are given the same shape so that the opposed substrate exists above the short ring cutting portion. With this configuration, not only the short ring cutting portion but also the peripheral driver circuit regions can be protected. In addition, a flush structure can be obtained which has no protrusion or recess over the entire liquid crystal display device.

In the above configuration, since the short ring cutting portion is interposed between the TFT substrate and the opposed substrate, the short rings are cut by utilizing laser light. The laser light is transmitted through the opposed substrate or applied from the underside of the TFT substrate. To attain efficient illumination of the short ring cutting portion with laser light, black matrixes, color filters, etc. on the opposed substrate are etched into patterns that allow transmission of the laser light to the short ring cutting portion. A YAG laser may be used for this purpose. Although the laser light reaches the short ring cutting portion through the one of the substrate, the reduced intensity of the laser causes no problem.

However, the structure in which the short ring cutting portion is provided in the area that is interposed between the TFT substrate and the opposed substrate, it may cause an event that particles of metal wiring lines or liquid crystal material damaged by laser light irradiation diffuses into the display pixel region. To avoid this problem, a sealing member is provided between the short ring cutting portion and the display pixel region.

Since the short ring cutting portion is formed inside the liquid crystal display device, it is isolated from the external environment. Since there is no need of providing projected portions of the TFT substrate, a flush structure is attained, whereby the liquid crystal display device can have a smaller outer frame for the same panel size. The sealing member that is formed between the short ring cutting portion and the display pixel region can prevent diffusion of particles of short ring material or liquid crystal material which have been damaged by laser light irradiation.

DETAILED DESCRIPTION OF THE PREFERRED EMBODIMENTS

Figure 1A:
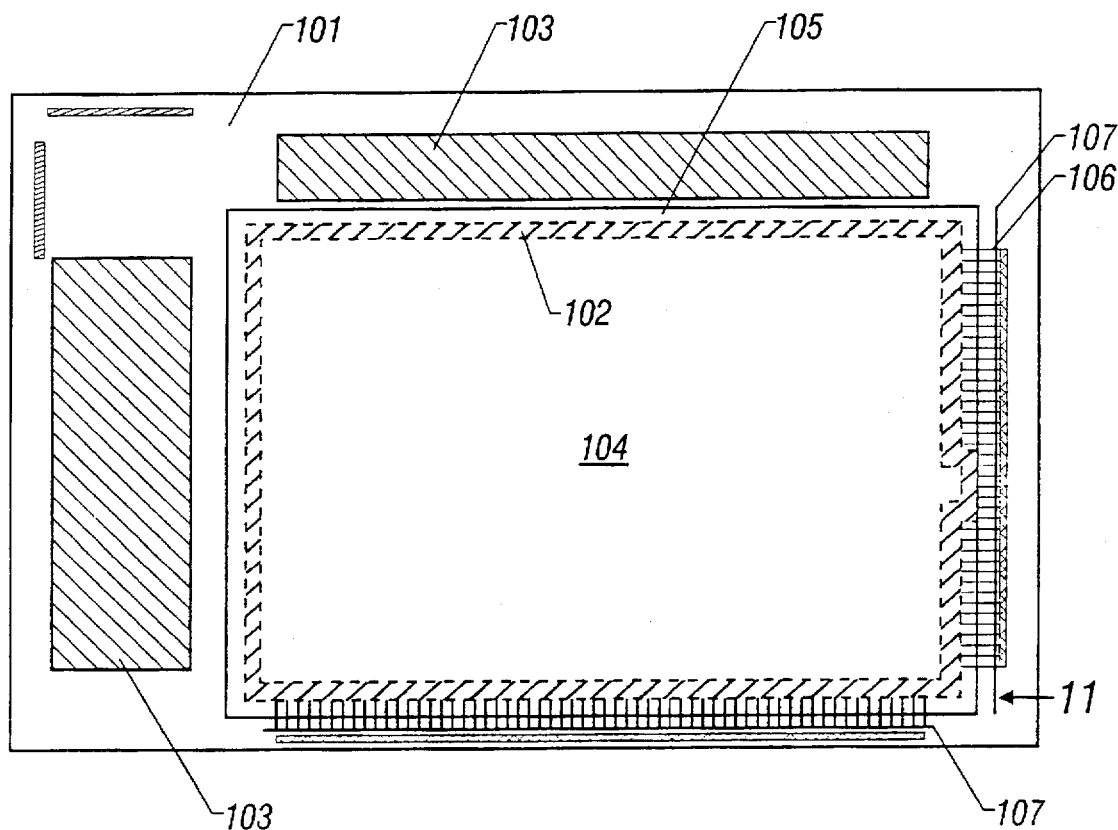
FIG. 1A schematically shows a conventional active matrix liquid crystal display device.
Figure 1B:
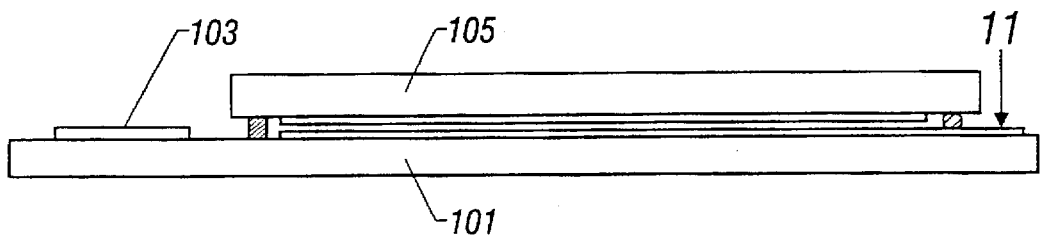
FIG. 1B is a sectional view of a conventional active matrix liquid crystal display device.
Figure 2A:
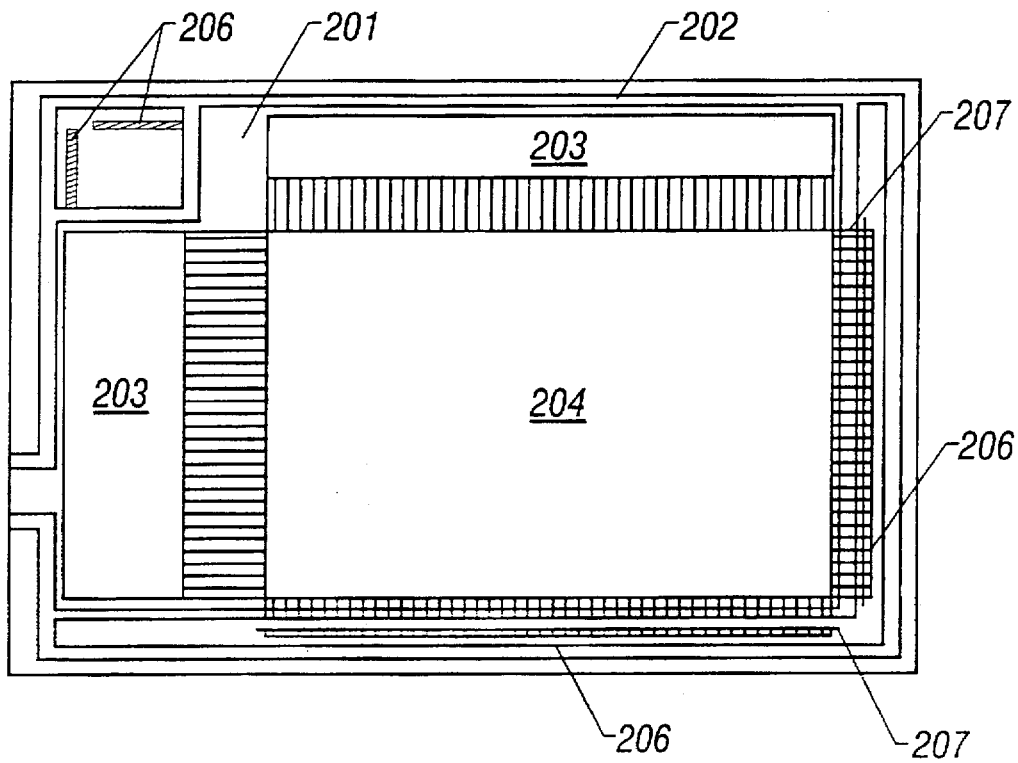
FIGS. 2A and 2B schematically show TFT substrates according to an embodiment of the present invention.
Figure 2B:
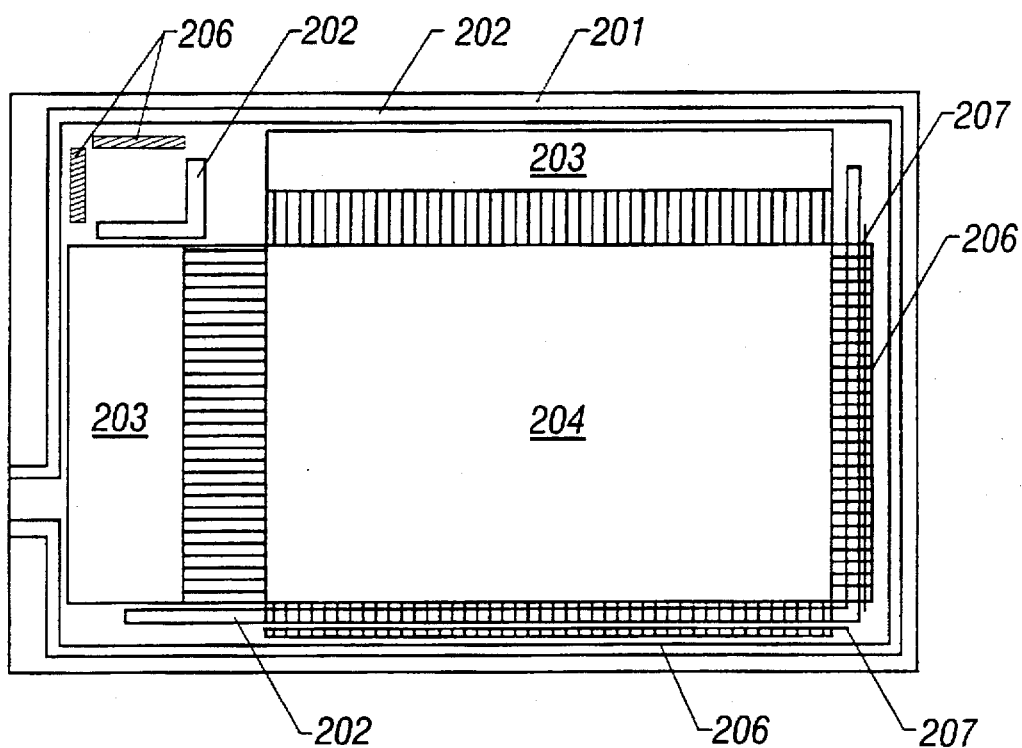

A liquid crystal display device according to an embodiment of the present invention will be hereinafter described. Each of FIGS. 2A and 2B shows a TFT substrate according to the embodiment which is manufactured by the following process.

First, a matrix-like pixel region 204 and peripheral circuit regions 203 for driving the pixel region 204 are formed a non-alkali glass substrate 201 of 80 mm×200 mm×1.1 mm by a known method or some other proper method. A process for forming the peripheral driver circuits and the active matrix circuit of this embodiment will be described later.

In the pixel region 204, at least one TFT as a switching element is provided for each of pixel electrodes that are arranged in a matrix of several hundred by several hundred. In the peripheral driver circuit regions 203, circuits for driving the TFTs of the pixel region 204, such as a shift register or an address decoder, are constituted also by using TFTs. The peripheral driver circuit regions 203 include other necessary circuits. Short ring connecting portions 206 are positioned as shown in FIGS. 2A and 2B. A portion to which wiring lines coming from an external circuit for supplying image signals are to be connected is formed at an edge portion near the peripheral driver circuit regions 203 on the TFT substrate 201.

Also, an opposed substrate uses a non-alkali glass substrate of 80 mm×200 mm×1.1 mm. A 1,000-Å-thick Cr film for a black matrix is formed on this glass substrate by sputtering, and then etched into a pattern which allows light transmission only at the respective pixels and short-ring cutting portions 207. Then, an ITO transparent electrode is formed at a thickness of 1,200 Å by sputtering.

Next, an orientation film is formed on each of the TFT substrate and the opposed substrate thus produced. The orientation film material used may be obtained by dissolving about 10 wt % of polyimide in a solvent such as butyl cellosolve, n-methyl-2-pyrrolidone, or γ-butyrolactone. This material is called "polyimide varnish." In this embodiment, a low-temperature-firing type polyimide vanish AL-3046 of Nippon Synthetic Rubber Co., Ltd. is used. Polyimide varnish may be applied to the substrates by using a spinner or a flexographic or screen printing machine.

The polyimide varnish orientation film thus applied to each of the TFT substrate and the opposed substrate is then set (fired) by baking in which a hot wind of 180° C. is blown over the film.

Next, to form fine grooves on the orientation film that is formed on the each substrate surface, a rubbing step is performed in which the orientation film is rubbed in a certain direction with a buff cloth (made of fiber of rayon, nylon, or the like) having a staple length of 2 to 3 mm.

Then, plastic spacers (Micropearl of Sekisui Fine Chemical Co., Ltd.) having a grain diameter of 5.0 µm are distributed over the TFT substrate by a dry spray method in which a spacer-dispersed nitrogen gas is jetted to the substrate.

Next, a sealing member 202 is applied to peripheral portions of each of the TFT substrate and the opposed substrate. On the TFT substrate, it is formed outside the peripheral circuit regions 203 and the short ring cutting portions 207, and between the pixel region 204 and the short ring cutting portions 207 (see FIGS. 2A and 2B). FIG. 2A shows a general pattern of the sealing member 202. Where a liquid crystal is also to be used to protect the short ring cutting portions 207, sealing members 202' for separating the short ring cutting portions 207 from the pixel region 204 is formed independently of the outer sealing members 202 to allow the liquid crystal to also exist around the short ring cutting portions 207 (see FIG. 2B).

The sealing members 202 serve to bond the TFT substrate and the opposed substrate together as well as to prevent an injected liquid crystal material from flowing out. The sealing material may be obtained by dissolving an epoxy resin and a phenol curing agent in a solvent of ethyl cellosolve.

After the sealing members 202 are applied, the two glass substrates are bonded together. The TFT substrate and the opposed substrate (color filter substrate) are bonded/fixed to each other by pressing those substrates against each other for 3 hours at 160° C. and thereby heat-setting the sealing members 202.

Then, a liquid crystal material is injected into the above bonded structure from a liquid crystal injection inlet. After the injection, the inlet is sealed with an epoxy resin.

Next, the short rings are cut by irradiating laser light to the cutting portions 207 (see FIGS. 2A and 2B) between the wire lines flaming the matrix structure and the short rings. A YAG laser is used and the irradiation light intensity is set at $1\times10^7$ W/cm$^2$ per pulse. In the liquid crystal display device of this embodiment, since laser light is applied to the TFT substrate through the opposed substrate, the light intensity is reduced as much However, this causes no problem in the short ring cutting.

Since the sealing members 202 are so formed as to separate the pixel region 204 from the short ring cutting portions 207, it can be prevented that particles of metal wiring lines or a liquid crystal material which have been damaged by laser light irradiation diffuses into the pixel region 204.

Referring to FIGS. 3A to 3E, a description will now be made of a manufacturing process of the peripheral driver circuits and the active matrix circuit according to the embodiment. The left side of FIGS. 3A to 3E shows a manufacturing process of TFTs of a peripheral driver circuit and the right side shows a manufacturing process of a TFT of the active matrix circuit.

First, a silicon oxide film as an undercoat oxide film 302 is formed on a non-alkali glass substrate 301 at a thickness of 1,000 to 3,000 Å by sputtering or plasma CVD in an oxygen atmosphere.

Subsequently, an amorphous or polycrystal silicon film is formed at 300 to 1,500 Å, preferably 500 to 1,000 Å, by plasma CVD or LPCVD, and then crystallized by performing thermal annealing at more than 500° C., preferably at 800° to 950° C. Optical annealing may be performed thereafter to improve the crystallinity. An element (catalyst element) such as nickel for accelerating crystallization of silicon may be added during the above crystallization step by thermal annealing, as described in Japanese Patent Laid-Open No. 6-244103 and No. 6-244104.

Next, the silicon film is etched into island-like active layers 303 to 305 of a p-channel and n-channel peripheral driver circuit TFTs and a matrix circuit TFT (pixel TFT), respectively. A silicon oxide gate insulating film 306 is then formed at a thickness of 500 to 2,000 Å by sputtering in an oxygen atmosphere. Instead of sputtering, plasma CVD may be employed in which case it is preferred that material gases of monosilane ($SiH_4$) and dinitrogen monoxide ($N_2O$) or oxygen ($O_2$) be used.

Figure 3A:
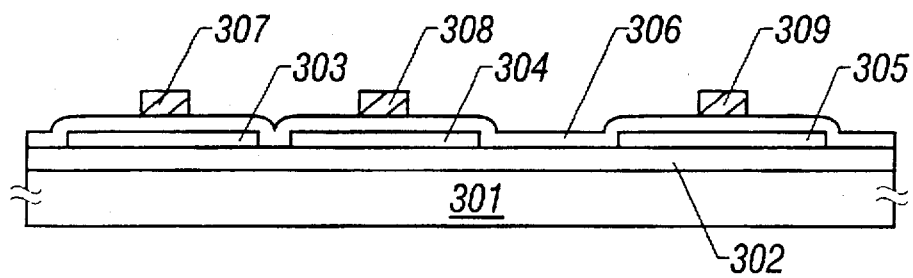
FIGS. 3A to 3E show a process for manufacturing a peripheral driver circuit and an active matrix circuit according to the embodiment.

Subsequently, a polycrystal silicon film (containing a very small amount of phosphorus to improve the conductivity) having a thickness of 2,000 Å to 5 μm, preferably 2,000 to 6,000 Å, is formed over the entire substrate by LPCVD. It is then etched into gate electrodes 307 to 309. (FIG. 3A)

Figure 3B:
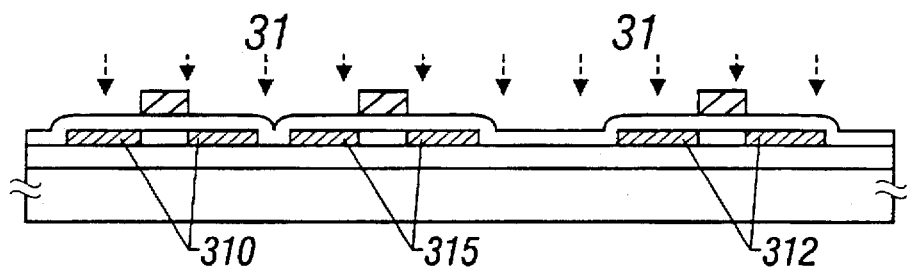

Then, phosphorus 31 is implanted into all the island-like active layers 303 to 305 by ion doping that uses a doping gas of phosphine, in a self-aligned manner with the gate electrodes 307 to 309 used as masks. The dose is set at $1 \times 10^{12}$ to $5 \times 10^{13}$ atoms/cm$^2$. As a result, weak n-type regions 310 to 312 are formed. (FIG. 3B)

Next, a photoresist mask 313 is so formed as to cover the active layer 303 of the p-channel TFT, and a photoresist mask 314 is so formed as to cover a part of the active layer 305 of the pixel TFT being 3 μm wider from each ends of the gate electrode 309.

Figure 3C:
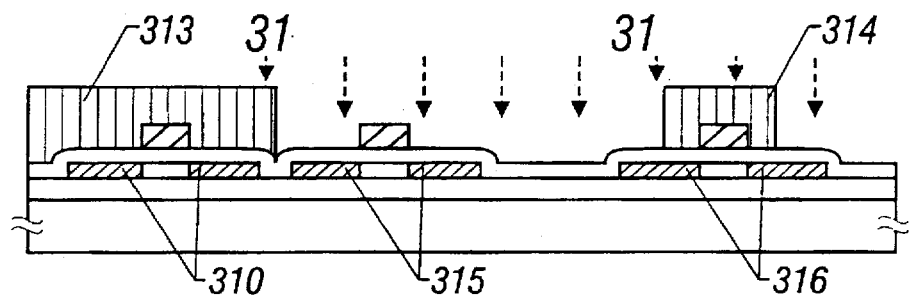

Then, phosphorus 31 is again implanted at a dose of $1 \times 10^{14}$ to $5 \times 10^{15}$ atoms/cm$^2$ by ion doping that uses a doping gas of phosphine. As a result, strong n-type regions (source and drain) 315 and 316 are formed. A part 317 of each weak n-type region 312 of the active layer 305 of the pixel TFT which part is covered with the mask 314 remains the weak n-type because it is not doped with phosphorus 31 this time. (FIG. 3C)

Next, after the active layers of the n-channel TFTs 304 and 305 are covered with a photoresist mask 318, boron 32 is implanted into the island-like region 303 by ion doping that uses a doping gas of diborane ($B_2H_6$). The dose is set at $5 \times 10^{14}$ to $8 \times 10^{15}$ atoms/cm$^2$.

Figure 3D:
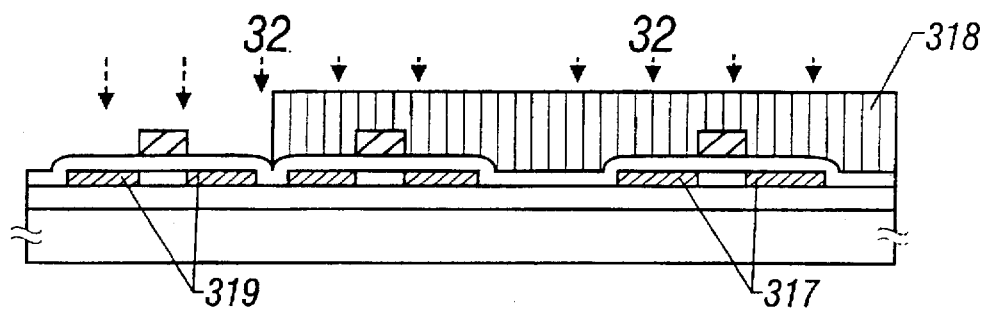
Figure 3E:
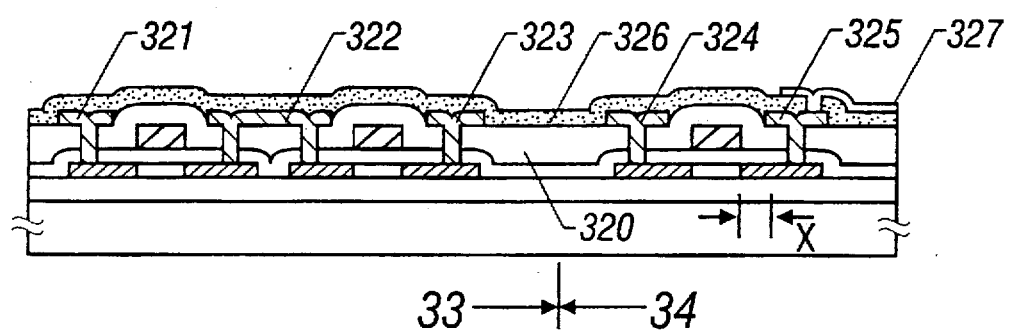

Since the boron dose of this doping is higher than the phosphorus dose in the doping of FIG. 3B, the previously formed weak n-type regions 310 turn to strong p-type regions 319. Thus, as a result of the above doping operations, the strong n-type regions (sources and drains) 315 and 316, the strong p-type regions (source and drain) 319, and the weak n-type regions (low-concentration impurity regions) 317 are formed. In this embodiment, the width x, as shown in FIG. 3E, of the low-concentration impurity regions 317 is about 3 μm. (FIG. 3D)

Subsequently, thermal annealing is performed at 450° to 850° C. for 0.5 to 3 hours to recover the doping damage, activate the doped impurities, and improve the crystallinity of silicon.

Then, a silicon oxide as an interlayer insulating film 320 is formed over the entire surface at a thickness of 3,000 to 6,000 Å by plasma CVD. Instead of the silicon oxide film, a silicon nitride film or a multi-layer film of a silicon oxide film and a silicon nitride film may be used. Contact holes for the sources and drains are then formed by etching the interlayer insulating film 320 by wet etching.

Next, a titanium film of 2,000 to 6,000 Å in thickness is formed by sputtering, and then etched into electrodes/wiring lines 321 to 323 of the peripheral circuit TFT 33 and electrodes/wiring lines 324 and 325 of the pixel TFT 34. Further, a silicon nitride film 326 as a passivation film is formed at a thickness of 1,000 to 3,000 Å by plasma CVD, and then etched to form a contact hole that reaches the electrode 325 of the pixel TFT 34.

Finally, an ITO (indium tin oxide) film of 500 to 1,500 Å in thickness is formed by sputtering, and then etched into a pixel electrode 327. Thus, the peripheral driver circuit and the active matrix circuit are formed on the same substrate. (FIG. 3E)

Figure 4:
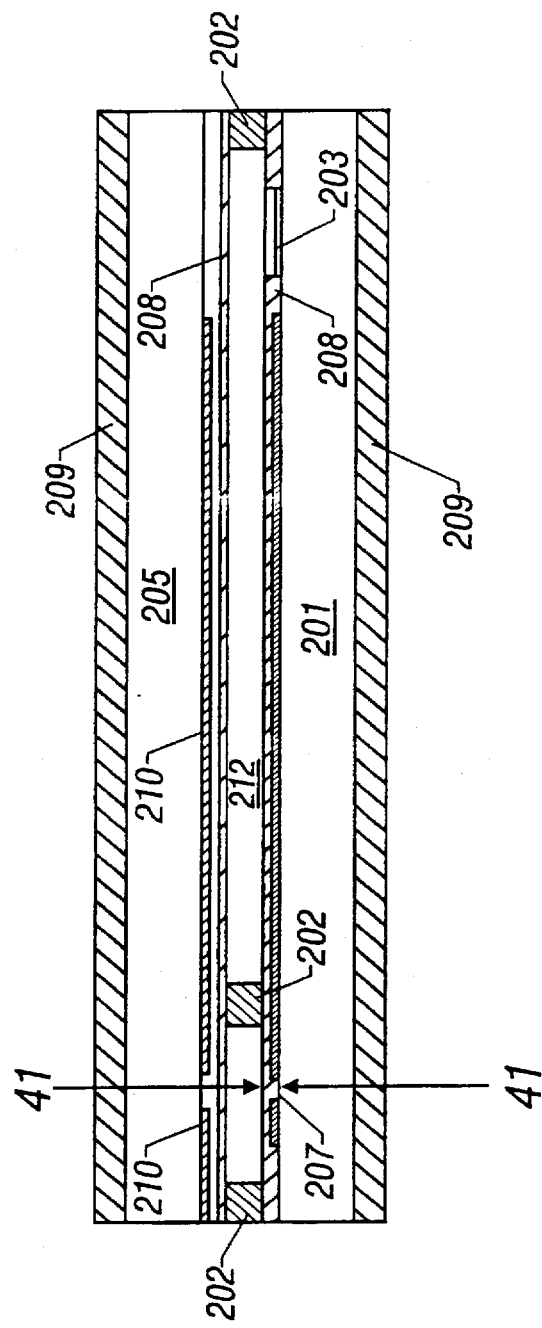
FIG. 4 is a sectional view of an active matrix liquid crystal display device according to the embodiment.

FIG. 4 is a sectional view of an active matrix liquid crystal display device according to the embodiment. The pixel region 204 and the orientation film 208 are formed on one surface of the TFT substrate 201 and a polarizing plate 209 is provided on the other surface.

A black matrix 210, a transparent electrode 211, and the orientation film 208 are formed on one surface of the opposed substrate 205, and a polarizing plate 209 is provided on the other surface. The TFT substrate 201 and the opposed substrate 205 are bonded together with the sealing members 202. A liquid crystal 212 is interposed between the TFT substrate 201 and the opposed substrate 205. Reference numeral 203 denotes one of the peripheral circuit regions; 207, one of the short ring cutting portions; and 41, laser light, respectively.

Figure 5:
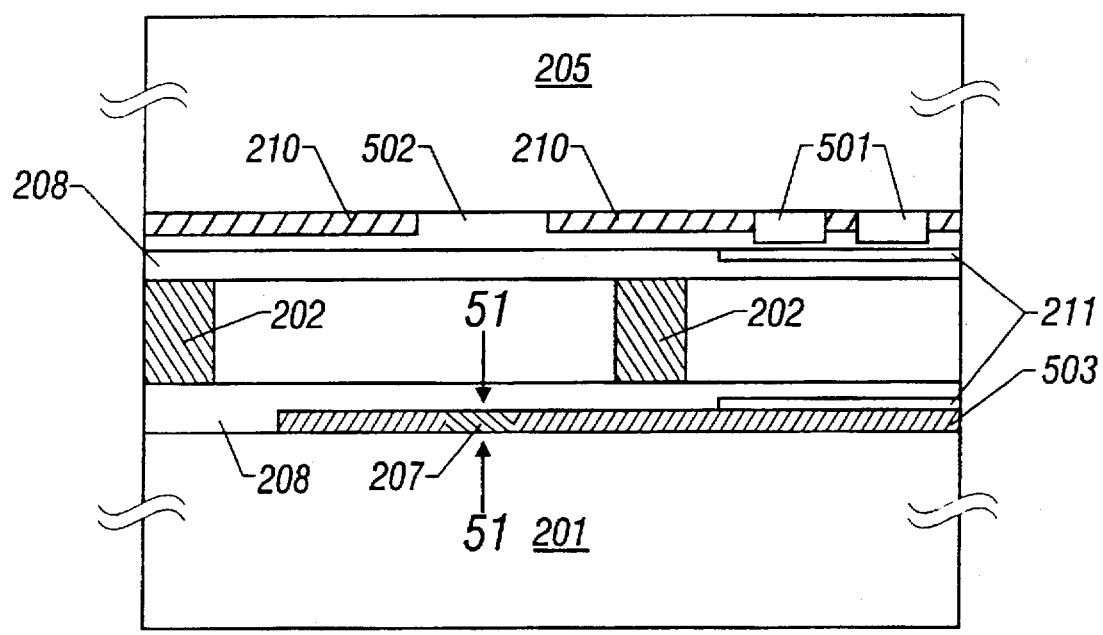
FIG. 5 is a sectional view showing a laser light irradiating portion and its vicinity of the active matrix liquid crystal display device according to the embodiment.

FIG. 5 is a sectional view showing and the vicinity of a laser light irradiation portion of the active matrix liquid crystal display device according to the embodiment. A wiring line 503 and the orientation film 208 are formed and a short ring cutting portion 207 exists on one surface of the TFT substrate 201.

The black matrix 210 and color filters 501 are formed on one surface of the opposed substrate 205, and a planarization film 502 covers those components. The transparent electrode 211 and the orientation film 208 are formed on the planarization film 502. To allow laser light 51 to reach the short ring cutting portion 207 more easily, the black matrix 210 and the color filters 501 are not provided above the short ring cutting portion 207. The TFT substrate 201 and the opposed substrate 205 are bonded together with the sealing members 202.

In the liquid crystal display device of this embodiment, a FPC (flexible print circuit) is used for connection to an external circuit which supplies image signals to the liquid crystal display device. The FPC is attached to a connecting portion that is provided at an edge portion of the TFT substrate 201.

As described above, the short ring cutting portions can be protected because they are provided inside the liquid crystal display device. Since no portion of the TFT substrate projects from the expanse common to the opposed electrode (flush structure), there is no need of securing spaces for accommodating projected portions of the TFT substrate in mounting on the device outer flame. Therefore, the liquid crystal display device can have a smaller outer frame for the same screen size. Further, on the opposed substrate, no metal parts, color filters, etc. are provided above positions where the metal wiring lines to be cut by laser light irradiation. This allows efficient at irradiating with laser light.

What is claimed is:

1. An active matrix liquid crystal display device comprising:
    thin-film transistors of a pixel region and thin-film transistors of a peripheral driver circuit region on a same substrate; and
    wiring lines that are connected to one or both of a plurality of gates and a plurality of sources,
    wherein a cutting portion of wiring lines is covered with an opposed substrate.

2. The device of claim 1, wherein a sealing member exists between the pixel region and the cutting portion of the wiring lines.

3. The device of claim 1, wherein a liquid crystal exists in the vicinity of the cutting portion of the wiring lines.

4. The device of claim 1, wherein the opposed substrate is provided with a light transparent region that faces the cutting portion of the wiring lines.

5. The device of claim 1, wherein the substrate having thin-film transistors is the same size as the opposed substrate.

6. An active matrix type liquid crystal display device comprising:

a first substrate comprising thin film transistors;

a second substrate opposed to the first substrate;

a first sealing region on at least one a portion of a periphery of the first substrate;

a second sealing region adjacent to the first sealing region; and a short rings cutting region between the first and the second sealing regions, wherein the second substrate covers both the first and the second sealing regions.

7. An active matrix type liquid crystal display device comprising:

a first substrate on which thin film transistors are formed on a pixel region and peripheral driver circuit region;

a second substrate, opposed to the first substrate, comprising black matrixes and color filters;

short ring cutting regions interposed between the first and the second substrates, wherein, over the regions, the black matrixes and the color filters do not exist in order to pass a laser through the second substrate for the cutting the short rings;

sealing member deposited, on the substrate having thin film transistors, around peripheral region and regions between the short ring cutting region and pixel region.

* * * * *